United States Patent
Lee

(10) Patent No.: US 6,239,521 B1
(45) Date of Patent: May 29, 2001

(54) MOTOR COVER ARRANGEMENT

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 0 days.

(21) Appl. No.: 09/491,497

(22) Filed: Jan. 25, 2000

(51) Int. Cl.[7] .................................................. H02K 9/06
(52) U.S. Cl. .................................. 310/62; 310/58; 310/47
(58) Field of Search .................................. 310/47, 52, 58, 310/62, 63

(56) References Cited

U.S. PATENT DOCUMENTS

| | | | |
|---|---|---|---|
| 5,315,193 | * | 5/1994 | Kummer et al. ........................ 310/50 |
| 5,701,045 | * | 12/1997 | Yokozawa et al. .................... 310/62 |

* cited by examiner

Primary Examiner—Nestor Ramirez
Assistant Examiner—Judson H. Jones

(74) Attorney, Agent, or Firm—Raymond Y. Chan; David and Raymond Patent Group

(57) ABSTRACT

A motor cover arrangement for covering a cooling fan of a motor enclosed in a motor case, wherein the motor cover arrangement includes a cooling fan cover and an air intake hood. The cooling fan cover has an open outlet end mounted on the motor case and an inlet end extended from the motor case to define a fan cavity to dispose the cooling fan therein and an air inlet opening in front of the cooling fan. The outlet end of the cooling fan cover defines an air discharge slot between the outlet end and the motor case to communicate with the air inlet opening. The air intake hood includes a base shell integrally covering the air inlet opening of the cooling fan cover and an air intake shell extended from the base shell to a side portion of the cooling fan cover to provide an air intake window so as to form an air intake passage between the air intake window positioned at the side portion of the cooling fan cover and the air inlet opening of the cooling fan cover. Thereby, fresh air can be sucked by the rotating cooling fan from outside via the air intake window, the air intake passage and the air inlet opening to cool down the motor and be discharged through the air discharge slot, so as to increase both the air sucking effect and cooling effect.

20 Claims, 6 Drawing Sheets

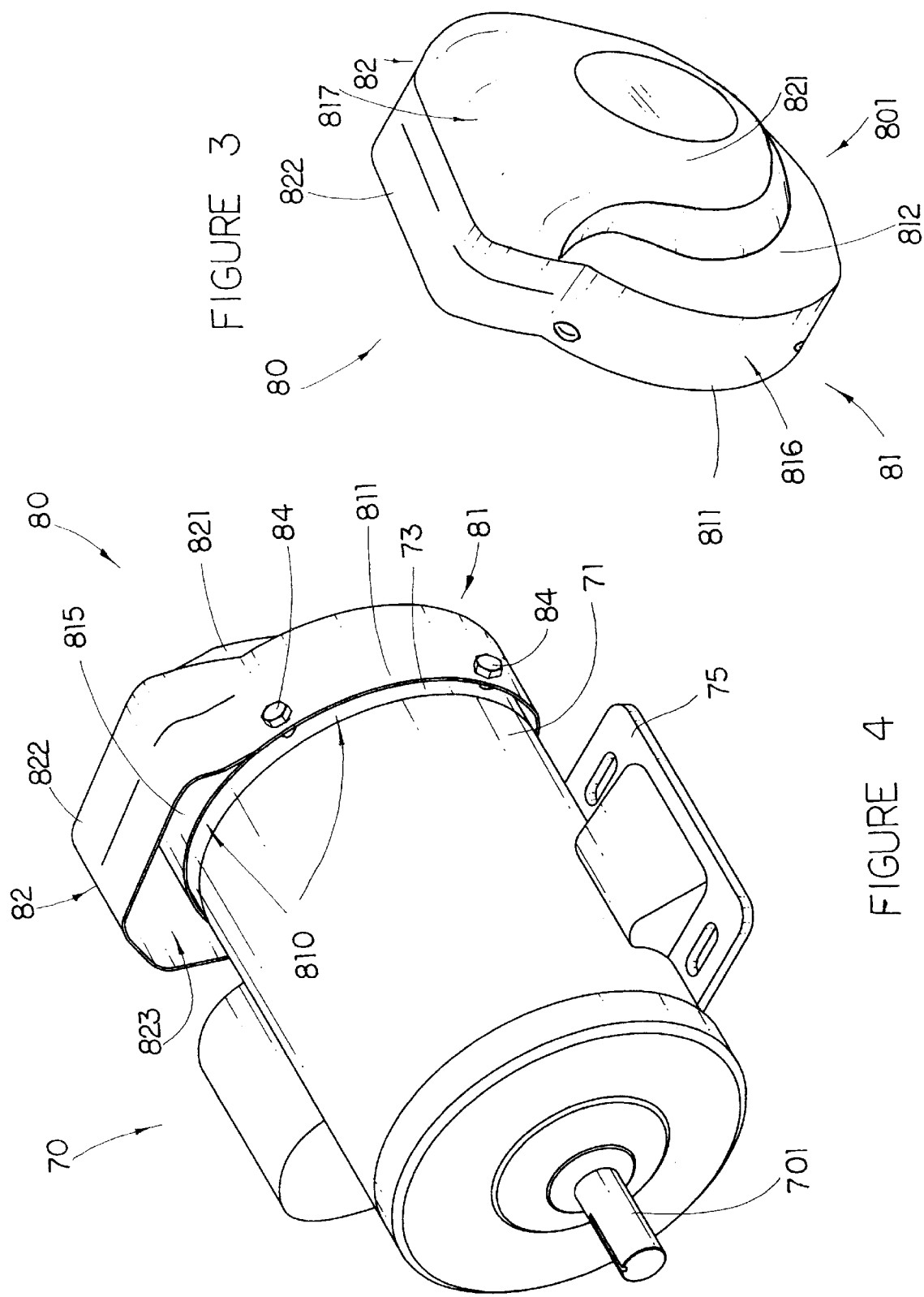

MOTOR COVER ARRANGEMENT

BACKGROUND OF THE PRESENT INVENTION

1. Field of Invention

The present invention relates to motors, and more particularly to a motor cover arrangement which can highly increase the motor's cooling effect, lower the motor's noise and decrease dust pollution of the motor's interior so as to prolong the service life span there of.

2. Description of Related Arts

A motor 1 converts electrical energy to mechanical energy wherein the motor 1 comprises a rotor 3 for transmitting mechanical work, electric circuit terminals 4 for inputting electrical energy, and an induction means 5 for generating magnetic field. As the electrical energy is input through the electric circuit terminals 4, a magnetic field is generated by the induction means 5 so as to generate magnetic force exerted on the rotor 3. The rotor 3 will be rotated through the magnetic field by means of the magnetic force and generate mechanical energy.

While the motor 1 converts electrical energy to mechanical energy, it generates heat energy as well. In order to prevent the motor 1 from overheating, the motor further comprises a cooling fan 6 coaxially mounted on a driving shaft 7 outwardly extended from the rotor 3. The rotor 3 is arranged to drive the cooling fan 6 to be coaxially rotated through the driving shaft 7 so as to suck the air from outside to cool down the heat generated in the motor 1.

In order to protect the motor, the conventional motor is disposed in a motor protective housing 8 for covering the motor 1, wherein the motor protective housing 8 comprises a motor shell 8a sheltered the motor 1 and a motor cover 8b coaxially mounted on a side of the motor shell 8b to cover the cooling fan 6. A plurality of ventilating holes 9 are provided on the end surface of the motor cover 8b so that air from outside can be sucked into the motor protective housing 8 by the cooling fan 6 through the ventilating holes 9 to achieve the cooling effect.

However, when the motor 1 is used in such a tough condition such as driving a saw blade of a cutting machine, saw dust will also be sucked into the motor 1 with air through the ventilating holes during operation. The motor 1 may be burned or permanent damage while the saw dust gradually accumulates to the rotor 3.

SUMMARY OF THE PRESENT INVENTION

A main object of the present invention is to provide a motor cover arrangement which will highly increase the motor's cooling effect to cool down the heat of the motor so as to prolong the service life span thereof Another object of the present invention is to provide a motor cover arrangement which air inlet is designed to position at an upper portion of the motor cover to sidewardly suck the fresh air into the motor in order to lower the motor's noise and decrease dust pollution of the motor's interior Another object of the present invention is to provide a motor cover arrangement which increases both the air sucking effect and cooling effect by sidewardly intaking fresh air and discharging hot air.

Another object of the present invention is to provide a motor cover arrangement which is adapted to install to all kinds of motor.

In order to accomplish the above objects, the present invention provides a motor cover arrangement for covering a cooling fan of a motor enclosed in a motor case, wherein the motor cover arrangement comprises:

a cooling fan cover having an open outlet end mounted on a supporting brim of the motor case and an inlet end sheltered around the cooling fan, wherein the inlet end of the cooling fan cover is extended from the motor case to define a fan cavity to dispose the cooling fan therein and an air inlet opening in front of the cooling fan, and that the outlet end of the cooling fan cover defines an air discharge slot between the outlet end and the motor case to communicate with the air inlet opening, so that when the cooling fan is driven to rotate by the motor, the cooling fan sucks in air through the air inlet opening and discharges the air to outside through the air discharge slot; and an air intake hood comprising a base shell integrally covering the air inlet opening of the cooling fan cover and an air intake shell extended from the base shell to a side portion of the cooling fan cover to provide an air intake window so as to form an air intake passage between the air intake window positioned at the side portion of the cooling fan cover and the air inlet opening of the cooling fan cover.

Thereby, fresh air can be sucked by the rotating cooling fan from outside via the air intake window, the air intake passage and the air inlet opening to cool down the motor and be discharged through the air discharge slot.

BRIEF DESCRIPTION OF THE DRAWINGS

FIG. 3 is a front perspective view of the motor cover arrangement according to the above preferred embodiment of the present invention.

FIG. 4 is a perspective view of a motor mounted with the motor cover arrangement according to the above preferred embodiment of the present invention.

DETAILED DESCRIPTION OF THE PREFERRED EMBODIMENT

Figure 5:
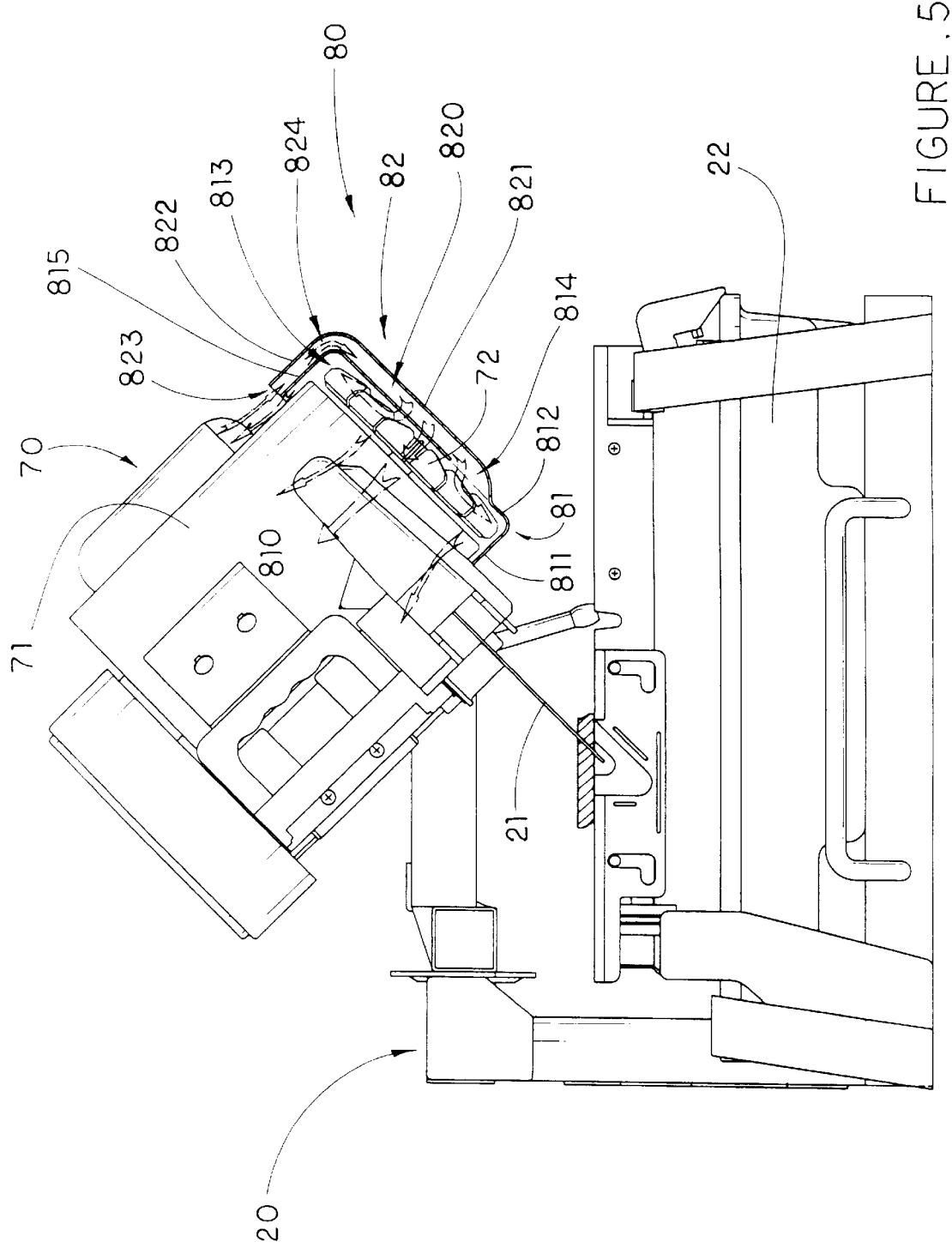
FIG. 5 is a perspective view of the motor cover arrangement mounted on the motor of a cutting machine according to the above preferred embodiment of the present invention.

Referring to FIGS. 2 to 5 of the drawings, a motor cover arrangement 80 according to a preferred embodiment of the present invention is illustrated. As shown in FIGS. 4 and 5, the motor cover arrangement 80 of the present invention is adapted for covering a cooling fan 72 of a motor 70 enclosed in a motor case 71.

Figure 1:
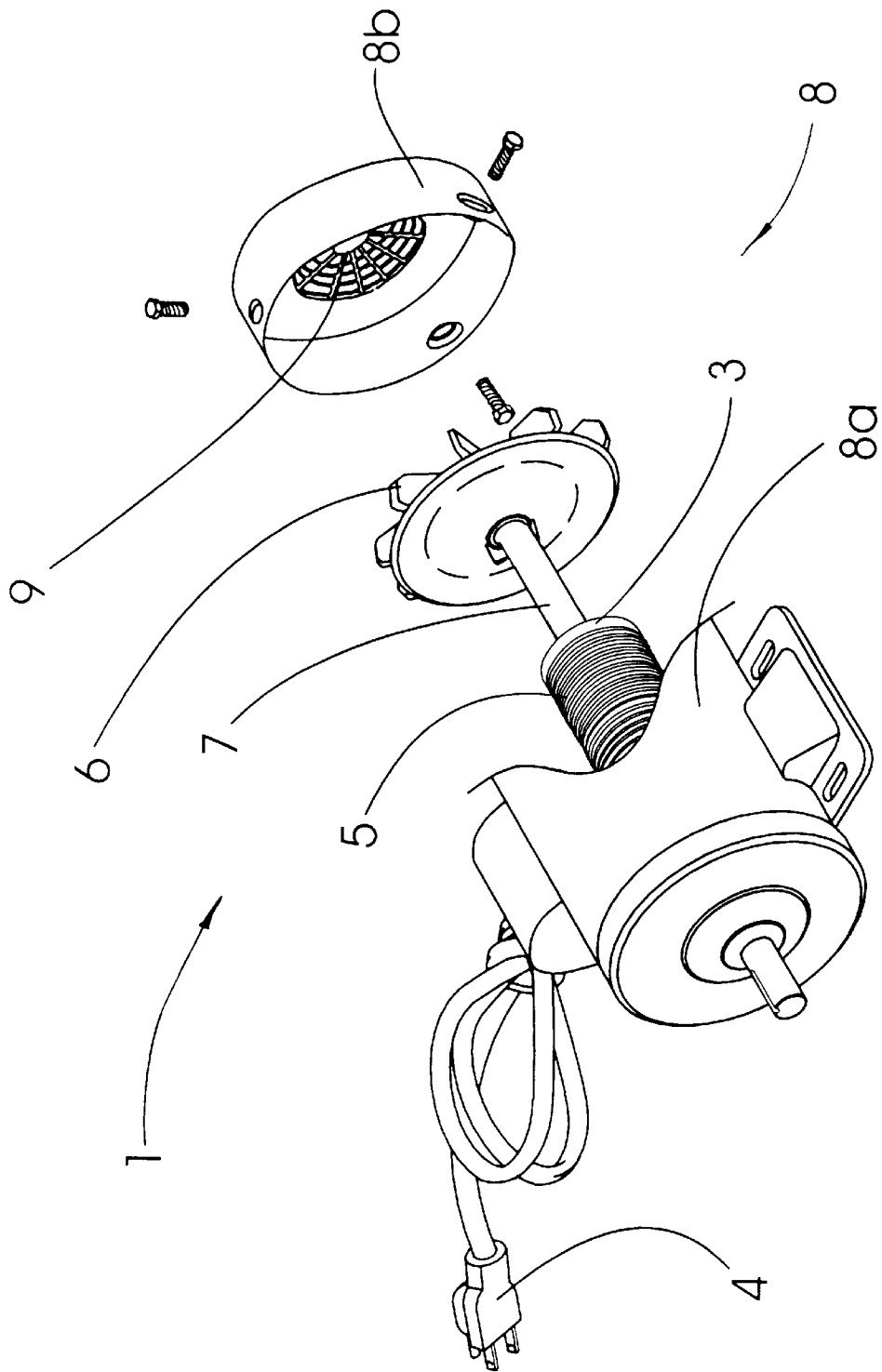
FIG. 1 is a perspective view of a conventional motor.

The motor case 71 is a hollow shell body having a first end defining a circular supporting brim 73 for encasing other motor components therein, such as the rotor 3, the electric circuit terminals 4 and the induction means 5 as shown in FIG. 1. A driving shaft 701 is outwardly and coaxially extended from a second end of the motor case 71 for transmitting a mechanical energy from the motor 70 to outside. A connecting base 75 is firmly affixed at a bottom of the motor case 71 for further installing and stabilizing the motor case 71 in position.

Figure 2:
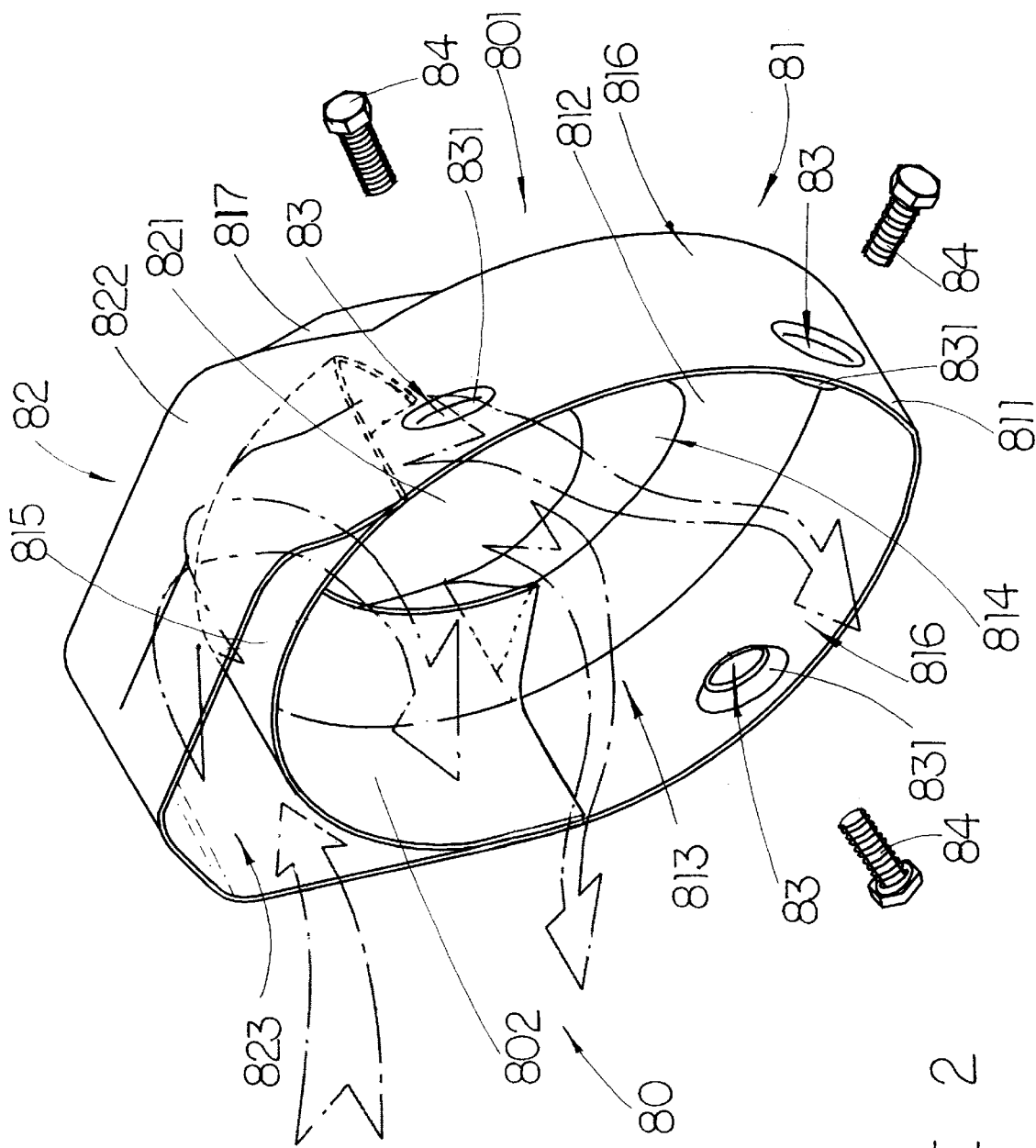
FIG. 2 is a rear perspective view of a motor cover arrangement according to a preferred embodiment of the present invention.

As shown in FIGS. 2, 3 and 4, the motor cover arrangement 80 comprises a cooling fan cover 81 and an air intake hood 82. The cooling fan cover 81 has an open outlet end 811 mounted on the supporting brim 73 of the motor case 71 and an inlet end 812 sheltered around the cooling fan 72, wherein the inlet end 812 of the cooling fan cover 81 is extended from the motor case 71 to define a fan cavity 813 to dispose the cooling fan 72 therein and an air inlet opening 814 in front of the cooling fan 72, and that the outlet end 811 of the cooling fan cover 81 defines an air discharge slot 810 between the outlet end 811 and the motor case 71 to communicate with the air inlet opening 814, as shown in FIG. 4.

Accordingly, as shown in FIG. 5, when the cooling fan 72 is driven to rotate by the motor 70, the cooling fan 72 sucks in air through the air in let opening 814 and discharges the air to outside through the air discharge slot 810.

The air intake hood 82 comprises a base shell 821 integrally covering the air inlet opening 814 of the cooling fan cover 81 to form an air chamber 820 in front of the air inlet opening 814 of the cooling fan cover 81 and an air intake shell 822 extended from the base shell 821 to an upper side portion 815 of the cooling fan cover 81 to provide an air intake window 823 defined between the upper side portion 815 of the cooling fan cover 81 and the air intake shell 822, so as to form an air intake passage 824 communicating between the air intake window 823 positioned at the upper side portion 815 of the cooling fan cover 81 and the air inlet opening 814 of the cooling fan cover 81, as shown in FIG. 5.

Thereby, as shown in FIG. 5, fresh air can be sucked by the rotating cooling fan 72 from outside via the air intake window 823, the air intake passage 824 and the air inlet opening 814 to cool down the motor 70 and be discharged through the air discharge slot 810.

As illustrated in FIG. 5, when motor cover arrangement 2 is used to cover the cooling fan 72 of the motor 70 of a cutting machine 20, cool fresh air above the motor 70 will be sucked into the fan cavity 813 through the air intake window 823. It is well known that large amount of saw dust will be produced during the cutting operation of the cutting machine for cutting pieces of wood, marble, stone, or ceramic tile. The saw dust will also be sucked into the motor through the conventional motor cover, as shown in FIG. 1, because its ventilating holes are provided very close to the cutting blade 21 of the cutting machine 20. Moreover, cooling fluid applied onto the cutting blade 21 and inside the cooling fluid tray 22 will also enter the motor through the ventilating holes of the conventional motor cover.

However, since the air intake window 823 of the motor cover arrangement 80 of the present invention is designed to sidewardly open on top of the motor case 71, where the cooling fluid and saw dust are unable to reach, clean and fresh air above the cutting machine 20 will be sucked into the air chamber 820 through the air intake passage 824 by means of the rotating cooling fan 72 covered by the cooling fan cover 81. The cooling fan 72 will further drive the fresh air from the air chamber 820 to enter the fan cavity 813 via the air inlet opening 814 and discharge from the motor cover arrangement 80 through the air outlet slot 810.

In other words, the service life span of the motor 70 can be prolonged by preventing polluted air and fluid from entering the motor 70. Moreover, the motor cover arrangement 80 of the present invention can also reduce the noise of the motor 70. Generally, there is great noise generated in the conventional motor cover 8b as shown in FIG. 1, caused by the intaking air directly blowing against the rotating cooling fan 72. The air intake hood 82 prevents the intaking air directly blowing against the cooling fan 72. Instead, air is sucked into the air chamber 820 through the air intake window 823 silently and the cooling fan 72 merely drives the air from the air chamber 820 to cool the motor 70. Therefore, the noise of the motor can be largely reduced.

As shown in FIGS. 2 and 3, according to the preferred embodiment of the present invention, in order to facilitate the manufacture of the motor cover arrangement 80 in low cost and air-tight manner, the cooling fan cover 81 is partially constructed by a bowl shape cover body 801 and an arc shape guiding frame 802, and the air intake hood 82 is formed by an upper enlarged portion of the cover body 801.

As shown in FIG. 3, the cover body 801 is made by mold pressing to form single piece bowl shape body having a ring shaped connecting rim 816 and a base cover 817 integrally connected to one end side of the connecting rim 816. A central portion of the base cover 817 is indented to form the air chamber 820. The guiding frame 802 is a C-shape body having a L-shaped cross section. An upper portion of the connecting rim 816 is upwardly extended to form a U-shaped portion which forms the air intake passage 824 while the rest of the connecting rim 816 remains in a C-shape portion. Two ends of the guiding frame 802 are integrally connected with the C-shape portion of the connecting rim 816 in air tight manner to form the cooling fan cover 81 in circular shape and define the air inlet opening 814 and the fan cavity 813 between the C-shape portion of the connecting rim 816 and the guiding frame 802. Moreover, the space defined between the guiding frame 802 and the base cover 817 forms the air intake window 823 and the air intake passage 824.

The two ends of the guiding frame 802 can be welded with the C-shape portion of the cover body 801 when both the guiding frame 802 and the cover body 801 are made of metal.

As shown in FIGS. 4 and 5, the diameter of the cooling fan cover 81 is larger than that of the supporting brim 73 so as to define the air discharge slot 810 therebetween when the cooling fan cover 81 is mounted on the supporting brim 73 of the motor 70. The cooling fan cover 81 can be screwed on the supporting brim 73 of the motor 70 with a plurality of spacers intervally positioned therebetween.

As shown in FIG. 2, a plurality of mounting holes 83 are formed on the connecting rim 816 and a plurality of protruding rings 831 inwardly extended around the mounting holes 83 respectively to act as the spacers, so that a plurality of fastening screws 84 can be used to fasten the motor cover arrangement 80 to the supporting brim 73 of the motor case 71 through the mounting holes 83 while the spacers 831, i.e. the protruding rings, placing and supporting therebetween.

Figure 6:
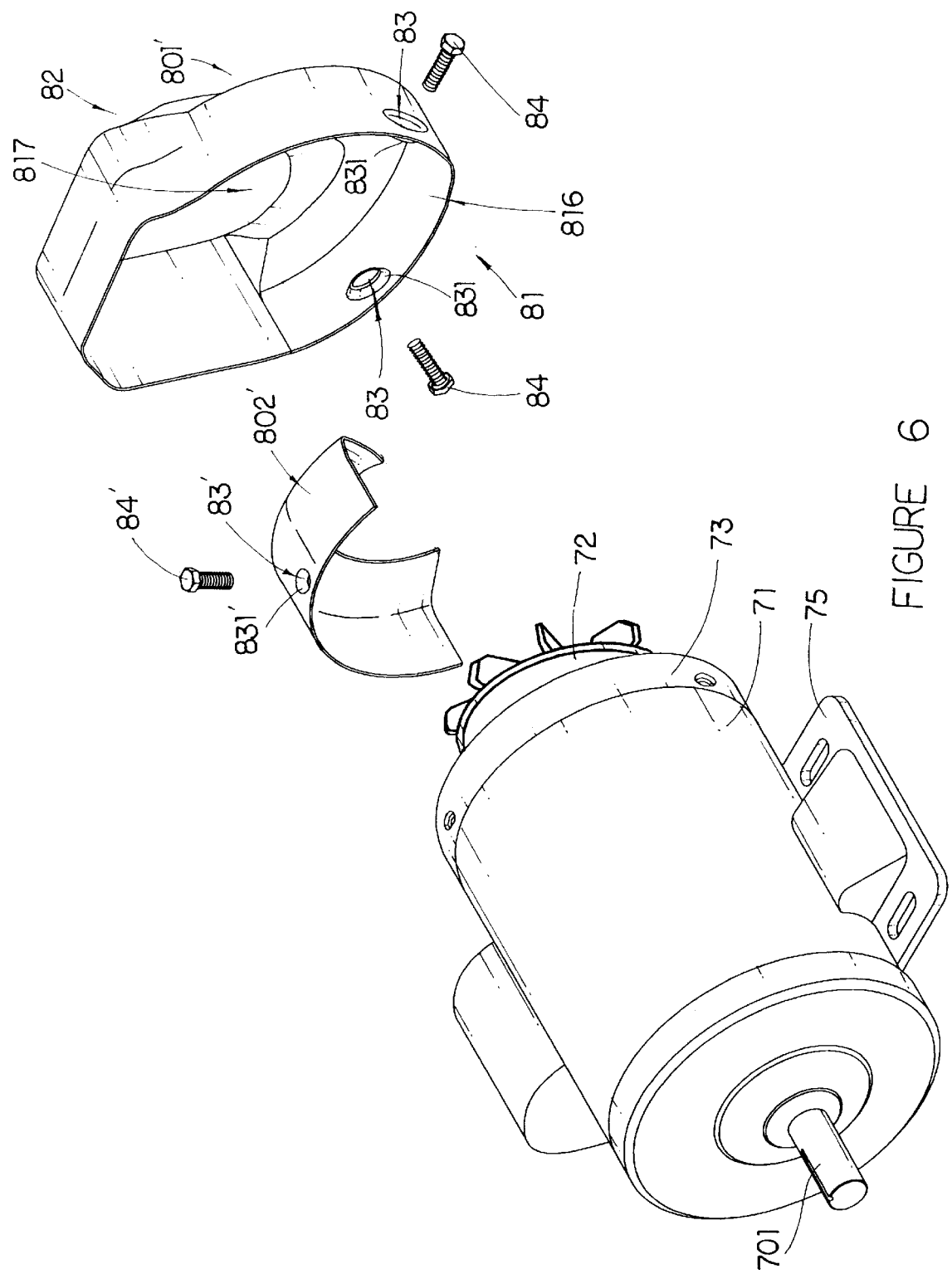
FIG. 6 is a partially exploded perspective view illustrating an alternative mode of the motor cover arrangement, including the motor to be mounted thereto, according to the above preferred embodiment of the present invention.

As shown in FIG. 6, an alternative mode of the above preferred embodiment of the present invention is illustrated, wherein a mounting hole 83' is also provided on the guiding frame 802' for directly screwing the guiding frame 802' on an upper portion of the supporting brim 73 of the motor case 71 instead of welding to the cover body 801'. A protruding ring 831' is also inwardly extended around the mounting hole 83' to form a spacer placing and supporting between the supporting brim 73 and the guiding frame 802'. Then, the cover body 801' is fastened to the supporting brim 73 of the motor case 71 by the screws 84 through the mounting holes 83 and spacers 831, as described in the above preferred embodiment.

Figure 7:
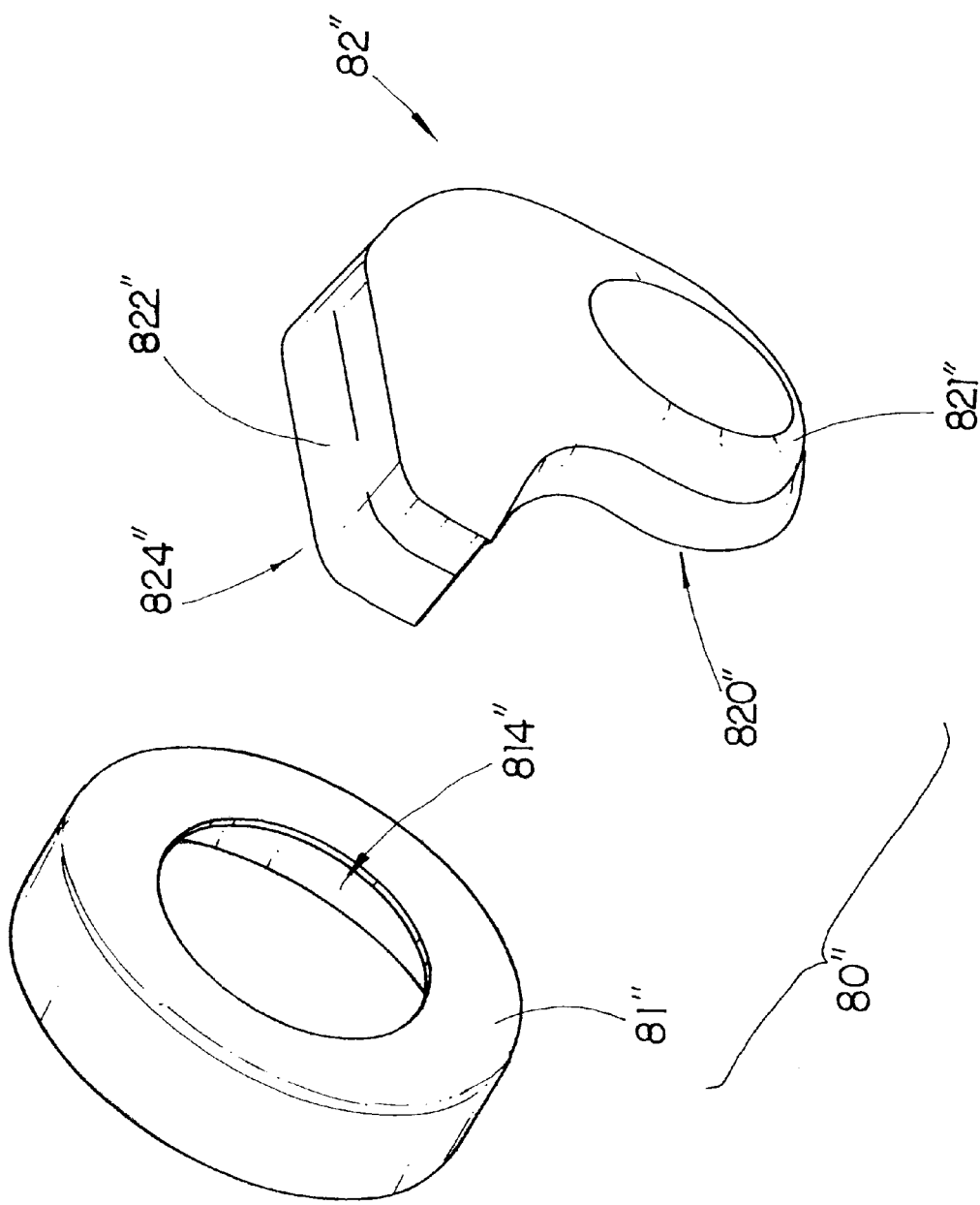
FIG. 7 is an exploded perspective view of another alternative mode of the motor cover arrangement according to the above preferred embodiment of the present invention

FIG. 7 illustrates another alternative mode of the above preferred embodiment of the present invention, wherein the cooling fan cover 81" of the motor cover arrangement 80" is made by molding to form a circular ring body having a L-shaped cross section. The base shell 821" and the air intake shell 822" of the air intake hood 802" are integrally made by molding, which is integrally connected by welding onto the cooling fan cover 81" in air-tight manner so as to cover the air inlet opening 814" and define the air chamber 820" and the air intake passage 824".

The advantages of the motor cover arrangement 80 of the present invention include the following:

1. The motor cover arrangement will highly increase the motor's cooling effect to cool down the heat of the motor so as to prolong the service life span thereof
2. The motor cover arrangement which air inlet is designed to position at an upper portion of the motor cover to sidewardly suck the fresh air into the motor in order to lower the motor's noise and decrease dust pollution of the motor's interior
3. The sucking effect of the motor will be highly increased by generating a circulated motion of air cycle in the motor cover arrangement so that more air will be sucked into the fan cavity through the air intake window for dissipating the heat of the motor.
4. The motor cover arrangement of the present invention is adapted to install to all kinds of motor, that is a most simple way to improve the performance and the noise problem of the motor.

What is claimed is:

1. A motor cover arrangement for covering a cooling fan of a motor enclosed in a motor case, wherein said motor cover arrangement comprises:

a cooling fan cover for sheltering around said cooling fan, said cooling fan having an open outlet end mounted on said motor case and an inlet end extended from said motor case to define a fan cavity for disposing said cooling fan therein, wherein an air inlet opening is formed at said inlet end in front of said cooling fan and an air discharge slot is defined between said outlet end and said motor case to communicate said air inlet opening with outside, so that when said cooling fan is driven to rotate by said motor, said cooling fan sucks in air through said air inlet opening and discharges said air to outside through said air discharge slot; and an air intake hood comprising a base shell integrally covering said air inlet opening of said cooling fan cover and an air intake shell extending from said base shell to a side portion of said cooling fan cover to provide an air intake window, wherein an air intake passage is formed between said air intake window positioned at said side portion of said cooling fan cover and said air inlet opening of said cooling fan cover, thereby the air sucked by said cooling fan via said air intake window, said air intake passage and said air inlet opening to cool down said motor is discharged through said air discharge slot.

2. The motor cover arrangement, as recited in claim 1, wherein said base shell of said air intake hood further has an air chamber formed in front of said air inlet opening of said cooling fan cover.

3. The motor cover arrangement, as recited in claim 2, wherein said cooling fan cover of said motor cover arrangement is made by molding to form a circular ring body having a L-shaped cross section, and said base shell and said air intake shell are integrally made by molding to form the air intake hood which is integrally connected onto said cooling fan cover in air-tight manner so as to cover said air inlet opening and define said air chamber and said air intake passage.

4. The motor cover arrangement, as recited in claim 2, wherein said cooling fan cover is partially constructed by a bowl shape cover body and an arc shape guiding frame, and said air intake hood is formed by an upper enlarged portion of said cover body.

5. The motor cover arrangement, as recited in claim 4, wherein said cover body is made by molding to form a single piece body having a ring shaped connecting rim and a base cover integrally connected to one end side of said connecting rim, a central portion of said base cover being indented to form said air chamber, wherein said guiding frame is a C-shape body having a L-shaped cross section, an upper portion of said connecting rim being upwardly extended to form a U-shaped portion while a lower portion of said connecting rim remains in a C-shape portion, wherein two ends of said guiding frame are integrally connected with two ends of said C-shape portion of said connecting rim to form said cooling fan cover in circular shape and define said air inlet opening and said fan cavity between said C-shape portion of said connecting rim and said guiding frame, wherein a space defined between said guiding frame and said base cover forms said air intake window and said air intake passage.

6. The motor cover arrangement, as recited in claim 5, wherein said two ends of said guiding frame are welded with said C-shape portion of said cover body when both said guiding frame and said cover body are made of metal.

7. The motor cover arrangement, as recited in claim 3, wherein a diameter of said cooling fan cover is larger than a diameter of a supporting brim provided at one end of said motor case so as to define said air discharge slot therebetween when said cooling fan cover is mounted on said supporting brim of said motor case.

8. The motor cover arrangement, as recited in claim 5, wherein a diameter of said cooling fan cover is larger than a diameter of a supporting brim provided at one end of said motor case so as to define said air discharge slot therebetween when said cooling fan cover is mounted on said supporting brim of said motor case.

9. The motor cover arrangement, as recited in claim 7, wherein a plurality of spacers are intervally positioned between said cooling fan cover and said supporting brim of said motor case.

10. The motor cover arrangement, as recited in claim 8, wherein a plurality of spacers are intervally positioned between said cooling fan cover and said supporting brim of said motor case.

11. The motor cover arrangement, as recited in claim 9, wherein a plurality of mounting holes are formed around said cooling fan cover and a plurality of protruding rings inwardly extended around said mounting holes respectively to act as said spacers, wherein a plurality of fastening screws are used to fasten said motor cover arrangement to said motor case through said mounting holes while said spacers placing and supporting therebetween.

12. The motor cover arrangement, as recited in claim 10, wherein a plurality of mounting holes are formed on said connecting rim and a plurality of protruding rings inwardly extended around said mounting holes respectively to act as said spacers, wherein a plurality of fastening screws are used to fasten said motor cover arrangement to said supporting brim of said motor case through said mounting holes while said spacers placing and supporting therebetween.

13. The motor cover arrangement, as recited in claim 4, wherein said cover body is made by molding to form a single piece body having a ring shaped connecting rim and a base cover integrally connected to one end side of said connecting rim, a central portion of said base cover being indented to form said air chamber, wherein said guiding frame is a C-shape body having a L-shaped cross section, an upper portion of said connecting rim being upwardly extended to form a U-shaped portion while a lower portion of said connecting rim remains in a C-shape portion, wherein said guiding frame is fastened on said motor case to shelter an upper portion of said cooling fan and said cover body is also fastened to said motor case to cover said guiding frame and said cooling fan.

14. The motor cover arrangement, as recited in claim 13, wherein a mounting hole is also provided on said guiding frame for directly screwing said guiding frame 802' on an upper portion of a supporting brim provided at one end of said motor case, and a protruding ring is also inwardly extended around said mounting hole to form a spacer placing and supporting between supporting brim and said guiding frame.

15. The motor cover arrangement, as recited in claim 14, wherein a diameter of said cooling fan cover is larger than a diameter of said supporting brim provided at one end of said motor case so as to define said air discharge slot therebetween when said cooling fan cover is mounted on said supporting brim of said motor case.

16. The motor cover arrangement, as recited in claim 15, wherein a plurality of spacers are intervally positioned between said cooling fan cover and said supporting brim of said motor case.

17. The motor cover arrangement, as recited in claim 16, wherein a plurality of mounting holes are formed on said connecting rim and a plurality of protruding rings inwardly extended around said mounting holes respectively to act as said spacers, wherein a plurality of fastening screws are used to fasten said motor cover arrangement to said supporting brim of said motor case through said mounting holes while said spacers placing and supporting therebetween.

18. The motor cover arrangement, as recited in claim 1, wherein said air intake window is sidewardly opened on top of said motor case.

19. The motor cover arrangement, as recited in claim 3, wherein said air intake window is sidewardly opened on top of said motor case.

20. The motor cover arrangement, as recited in claim 5, wherein said air intake window is sidewardly opened on top of said motor case.

* * * * *